(12) United States Patent
Im et al.

(10) Patent No.: US 9,138,941 B2
(45) Date of Patent: Sep. 22, 2015

(54) METHOD OF PREPARING POROUS METAL OXIDE STRUCTURE

(71) Applicant: Samsung Electronics Co., Ltd., Suwon-Si, Gyeonggi-Do (KR)

(72) Inventors: Kyu-Hyun Im, Yongin-si (KR); No-kyoung Park, Hwaseong-si (KR); Jae-hyun Hur, Yongin-si (KR); Sang-Won Kim, Seoul (KR); Sung-jee Kim, Pohang-si (KR)

(73) Assignees: Samsung Electronics Co., Ltd., Gyeonggi-Do (KR); Postech Academy-Industry Foundation, Gyeongsangbuk-Do (KR)

( * ) Notice: Subject to any disclaimer, the term of this patent is extended or adjusted under 35 U.S.C. 154(b) by 0 days.

(21) Appl. No.: 14/456,405

(22) Filed: Aug. 11, 2014

(65) Prior Publication Data
US 2015/0210017 A1 Jul. 30, 2015

(30) Foreign Application Priority Data
Jan. 29, 2014 (KR) .................... 10-2014-0011739

(51) Int. Cl.
| H01L 51/40 | (2006.01) |
| B29C 67/20 | (2006.01) |
| C01G 23/047 | (2006.01) |
| C01F 7/02 | (2006.01) |
| C01G 9/02 | (2006.01) |
| B29L 31/00 | (2006.01) |

(52) U.S. Cl.
CPC . *B29C 67/20* (2013.01); *C01F 7/02* (2013.01); *C01G 9/02* (2013.01); *C01G 23/047* (2013.01); *B29L 2031/00* (2013.01)

(58) Field of Classification Search
CPC ....... A61L 27/06; A61L 27/12; A61L 27/227; B01D 2323/283; B01D 67/0062; C30B 7/005
USPC .......................... 257/40; 438/82, 99, 669, 680
See application file for complete search history.

(56) References Cited

U.S. PATENT DOCUMENTS
| 6,696,258 B1 | 2/2004 | Wei et al. |
| 2014/0104753 A1 | 4/2014 | Park et al. |

FOREIGN PATENT DOCUMENTS
| KR | 20090128835 A | 12/2009 |
| KR | 20120063925 A | 6/2012 |

OTHER PUBLICATIONS

Jungkyu K. Lee et al., "DNA-Templated Metallization for Formation of Porous and Hallow Silver-Shells", 2013, 986-988 pages, vol. 34, No. 3, Bull, Korean Chem. Soc.

*Primary Examiner* — Mark A. Laurenzi, III
(74) *Attorney, Agent, or Firm* — Harness, Dickey & Pierce

(57) ABSTRACT

Provided is an example method of preparing a porous metal oxide structure, the method including adsorbing a metal oxide precursor onto a template having a networked structure of branched polynucleotides, decomposing and converting the adsorbed metal oxide precursor into a metal oxide, and removing the template. The networked structure of branched polynucleotides may be used as a template so as to facilitate control of the pore structure of a porous metal oxide structure.

12 Claims, 3 Drawing Sheets

METHOD OF PREPARING POROUS METAL OXIDE STRUCTURE

RELATED APPLICATION

This application claims priority from Korean Patent Application No. 10-2014-0011739, filed on Jan. 29, 2014, in the Korean Intellectual Property Office, the disclosure of which is incorporated herein in its entirety by reference.

BACKGROUND

1. Field

Example embodiments of the present disclosure relate to methods of preparing a metal oxide, and more particularly, methods of preparing a porous metal oxide structure.

2. Description of the Related Art

A porous metal oxide structure may have, for example, micropores, mesopores, and/or macropores. A porous metal oxide structure may be formed in a shape of, for example, particles, discs, or rods, or may be formed in a regular hexagonal, triangular, or square shape.

A porous metal oxide structure is applicable in various fields. As a non-limiting example, a porous metal oxide structure may be used as an electrode for an electric double-layer, a structure for gas fuel adsorption, an absorbing agent, an ion-exchange material, or a catalyst.

With respect to a porous metal oxide structure, there is typically a need for an improved control of pore distribution. For example, a porous metal oxide structure, which has uniformly-sized pores that are evenly distributed, is sometimes preferred.

Conventionally, in order to prepare a porous metal-based structure, injection of gas bubbles into a molten metal, or sintering of metal-based materials in powder form has been conducted. However, these approaches for the preparation of the porous metal oxide structure are not suitable in terms of forming smaller-sized pores more evenly. In addition, these approaches for the preparation of the porous metal oxide structure are not suitable in terms of preparing a porous alloy material that includes metals, each of which has a different melting point. In particular, there are difficulties in evenly forming pores that have a pore size of about 2 nm. Also, it is typically difficult to provide a desired function to pores present in a desired position, and to design a structure in a desired shape.

SUMMARY

Example embodiments relate to methods of preparing a porous metal oxide structure.

Additional example embodiments will be set forth in part in the description which follows and, in part, will be apparent from the description, or may be learned by practice of the presented example embodiments.

According to at least one example embodiment, provided is a method of preparing a porous metal oxide structure, the method including adsorbing a metal oxide precursor onto a template having a networked structure of branched polynucleotides, decomposing and converting the adsorbed metal oxide precursor into a metal oxide, and removing the template.

According to another example embodiment, provided is a porous metal oxide structure prepared according to at least one example method.

BRIEF DESCRIPTION OF THE DRAWINGS

These and/or other example embodiments will become apparent and more readily appreciated from the following description of the example embodiments, taken in conjunction with the accompanying drawings in which.

DETAILED DESCRIPTION

Figure 1:
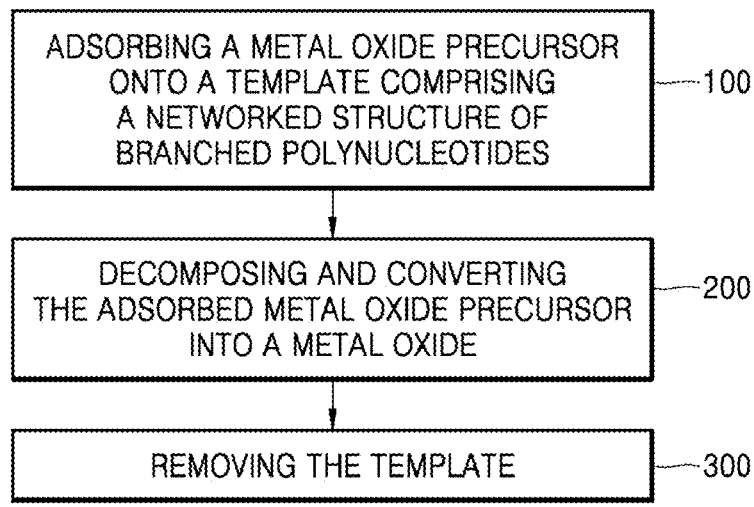
FIG. 1 is a flowchart schematically illustrating a method of preparing a porous metal oxide structure according to an example embodiment.

Reference will now be made in detail to example embodiments illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the present description. Expressions such as "at least one of," when preceding a list of elements, modify the entire list of elements and do not modify the individual elements of the list.

Hereinafter, a method of preparing a porous metal oxide structure according to an example embodiment will be described in detail. According to an example embodiment, the method of preparing a porous metal oxide structure includes adsorbing a metal oxide precursor onto a template having a networked structure of branched polynucleotides, decomposing and converting the adsorbed metal oxide precursor into a metal oxide, and removing the template.

FIG. 1 is a flowchart schematically illustrating a method of preparing the porous metal oxide structure, according to at least one example embodiment. According to the example embodiment of FIG. 1, the method includes adsorbing a metal oxide precursor onto a template having a networked structure of branched polynucleotides (step 100), decomposing and converting the adsorbed metal oxide precursor into a metal oxide (step 200), and removing the template (step 300).

The adsorbing of a metal oxide precursor onto a template having a networked structure of branched polynucleotides 100 is described as follows.

The template used herein may include a networked structure of branched polynucleotides.

The polynucleotide used herein may refer to a polymer of deoxyribonucleotides or a polymer of ribonucleotides. The polynucleotide may be a synthetic polynucleotide, a natural polynucleotide, or an analog thereof. Non-limiting examples of the polynucleotide are deoxyribonucleic acid (DNA), ribonucleic acid (RNA), peptide nucleic acid (PNA), locked nucleic acid (LNA), an analog thereof, or a combination thereof.

The branched polynucleotides used herein may be formed by complementary binding between at least two different polynucleotides. The complementary bond used herein refers to conjugation of at least two different polynucleotides under stringent conditions known in the art. Such stringent conditions may be determined by controlling temperature, ionic strength (e.g., concentration of a buffer solution), and the presence of a compound such as an organic solvent. Alternatively, stringent conditions may vary according to sequences to be conjugated. For example, the stringent conditions include a) washing with a mixture of 0.015 M sodium chloride/0.0015 M sodium citrate/0.1% sodium dodecyl sulfate at a temperature of 50° C., or b) conjugating with a conjugation buffer solution (containing 50% formamide, 2×SSC (saline-sodium citrate), and 10% dextran sulfate) at a temperature of 55° C., followed by washing with an EDTA (ethylenediaminetetraacetic acid)-containing 0.1×SSC solution at a temperature of 55° C.

As a non-limiting example, the branched polynucleotides may have X-type branches, Y-type branches, T-type branches, or a combination thereof. The branched polynucleotides may include multiple branches that are subsequently arranged, thereby forming a two-dimensional (2D) or a three-dimensional (3D) network. The branched polynucleotides in the form of such a 2D or 3D network are referred to as "a networked structure of branched polynucleotides".

For example, the networked structure of branched polynucleotides may be designed and synthesized in a manner that each arm of the branched polynucleotide molecules has a complementary sticky end and the complementary sticky end contains palindromic sequences. The molecules of the branched polynucleotides may be, for example, hybridized and ligated by a T4 DNA ligase. Accordingly, the molecules of the branched polynucleotides may be configured as a monomer and a cross-linking agent to form a networked structure. In addition, the branched polynucleotide molecules may have self-assembling properties. That is, the branched polynucleotide molecules may synthesize a 2D or 3D macrostructure, by using the self-assembling properties thereof and by using a ligase as a catalyst. Networked structure of branched polynucleotides formed thereby may then typically form hydrogels.

The networked structure of branched polynucleotides may be obtained by, for example, freeze-drying the branched polynucleotide hydrogels. The networked structure of branched polynucleotides may be used as a template. In consideration of the self-assembling properties of the molecules forming the branched polynucleotides, the template may relatively easily have a desired pore size, a desired pore size distribution, and/or a desired pore arrangement.

Non-limiting examples of the metal oxide precursor include metal halides, metal alkoxides, metal beta-diketonates, metal dialkylamides, metal amidinates, metal alkyls, metal cyclopentadienyls, or a combination thereof.

Non-limiting examples of the metal include aluminum, antimony, arsenic, barium, bismuth, boron, cadmium, calcium, cerium, chromium, cobalt, copper, erbium, europium, gadolinium, gallium, germanium, hafnium, holmium, iron, lanthanum, magnesium, manganese, molybdenum, neodymium, nickel, niobium, osmium, platinum, praseodimium, rhenium, rhodium, ruthenium, samarium, scandium, selenium, silicon, strontium, tantalum, tellurium, terbium, thulium, tin, titanium, tungsten, vanadium, ytterbium, yttrium, zinc, zirconium, or a combination thereof.

Non-limiting examples of the metal oxide precursor include $[(CH_3)_2CHCH_2]_3Al$, $Al(OCC(CH_3)_3CHCOC(CH_3)_3)_3$, $Al(N(CH_3)_2)_3$, $(CH_3)_3Al$, $(CH_3)_3Al$, $(CH_3)_3Al$; $(C_6H_5)_3Sb$, $[(CH_3)_2N]_3Sb$; $(C_6H_5)_3As$, $(C_6H_5)_3As$, $(C_6H_5)_3AsO$; $Ba(OCC(CH_3)_3CHCOC(CH_3)_3)_2 \cdot xH_2O$, $Ba(NO_3)_2$; $(CH_3CO_2)_2Bi(C_6H_5)_3$, $Bi(C_6H_5)_3$, $(CH_3OC_6H_4)_3Bi$; $[(CH_3)_2CHO]_3B$, Trimethylboron-d9($B(CD_3)_3$, $(C_6H_5)_3B$, $(C_6F_5)_3B$; $Cd(C_2H_7O_2)_2$; $Ca(OCC(CH_3)_3CHCOCF_2CF_2CF_3)_2$, $Ca(OCC(CH_3)_3CHCOC(CH_3)_3)_2$; $Ce(N(Si(CH_3)_3)_2)_3$; $Cr(C_5H_5)_2$, $Cr(C_5(CH_3)_5)_2$, $Cr(OCC(CH_3)_3CHCOC(CH_3)_3)_3$; $Co(C_5H_5)_2$, $C_{14}H_{18}Co$, $C_{14}H_{18}Co$, $C_{20}H_{30}Co$, $Co(OCC(CH_3)_3CHCOC(CH_3)_3)_3$; $Cu(OCC(CH_3)_3CHCOCF_2CF_3)_2$, $Cu(OCC(CH_3)_3CHCOC(CH_3)_3)_2$; $Er(OCC(CH_3)_3CHCOC(CH_3)_3)_3$, $Er(C_5H_4C_4H_9)_3$, $Er(C_5H_5)_3$; $Eu(N(Si(CH_3)_3)_2)_3$, $C_{27}H_{39}Eu$; $Gd(N(Si(CH_3)_3)_2)_3$, $Gd(C_5H_5)_3$, $C_{27}H_{39}Gd$; $(CH_3CH_2)_3Ga$, $Ga(CH_3)_3$, $C_{12}H_{36}Ga_2N_6$; $GeF_4$, $(C_2H_5)_3GeGe(C_2H_5)_3$, $(CH_3)_3GeGe(CH_3)_3$, $(C_6H_5)_3GeGe(C_6H_5)_3$, $Ge(C_2H_5)_4$, $(CH_3)_4Ge$, $[CH_3(CH_2)_3]_3GeH$, $(C_2H_5)_3GeH$, $(C_6H_5)_3GeH$, $[(CH_3)_3Si]_3GeH$; $C_2OH_{32}Hf$, $Hf[C_5H_4(CH_3)]_2(CH_3)_2$, $HfCH_3(OCH_3)[C_5H_4(CH_3)]_2$, $[[(CH_3)_3Si]_2N_2HfCl_2$, $(C_5H_5)_2Hf(CH_3)_2$, $Hf[OC(CH_3)_3]_4$, $C_{12}H_{28}HfO_4$, $[(CH_2CH_3)_2N]_4Hf$, $[(CH_3)_2N]_4Hf$, $[(CH_3)_2N]_4Hf$, $[(CH_3)(C_2H_5)N]_4Hf$, $[(CH_3)(C_2H_5)N]_4Hf$; $Ho(N(Si(CH_3)_3)_2)_3$; $(CO)_4Mo(P(C_6H_5)_2C_5H_4)_2Fe$, $Fe(C_5(CH_3)_5)_2$, $Fe(C_5H_4C_2H_5)_2$, $Fe(CO)_5$, $FeRCH_3)_3CCOCHCOC(CH_3)_3]$; $C_9H_{21}LaO_3$, $La(N(Si(CH_3)_3)_2)_3$, $La(C_5H_5)_3$, $C_{27}H_{39}La$; $Mg(C_5H_5)_2$, $Mg(C_5H_4C_2H_5)_2$, $C_2OH_3OMg$, $Mg(C_5H_4C_3H_7)_2$, $[(CH_3)_3CCOCHC(O)C(CH_3)_3]_2Mg \cdot xH_2O$; $Mn(C_5H_5)_2$, $Mn(C_5(CH_3)_5)_2$, $C_{18}H_{26}Mn$, $BrMn(CO)_5$, $C_5H_5Mn(CO)_3$, $C_2H_5C_5H_4Mn(CO)_3$, $Mn_2(CO)_{10}$; $C_{11}H_8MoO_4$, $C_{10}H_{10}C_{12}Mo$, $C_{16}H_{10}MO_2O_6$, $Mo(CO)_6$, $Mo(CO)_6$, $Mo(CO)_6$, $C_{22}H_{22}Mo_2O_6$, $C_7H_8Mo(CO)_3$, $Mo(NCCH_3)_3(CO)_3$; $Nd(N(Si(CH_3)_3)_2)_3$; $C_8H_{10}Ni$, $Ni(C_5H_5)_2$, $Ni(C_5H_4C_2H_5)_2$, $[(C_6H_5)_3P]_2NiCl_2$, $Ni(OCC(CH_3)_3CHCOC(CH_3)_3)_2$; $C_{10}H_{10}C_{12}Nb$; $OS_3(CO)_{12}$; $C_5H_4CH_3Pt(CH_3)_3$, $C_5H_4CH_3Pt(CH_3)_3$; $Pr(C_5HF_6O_2)_3 \cdot XH_2O$, $Pr(C_5H_5)_3$, $Re_2(CO)_{10}$; $C_{13}H_{19}O_2Rh$; $C_{10}H_{10}Ru$, $C_7H_9RuC_7H_9$, $C_7H_9RuC_7H_9$, $Ru(C_5(CH_3)_5)_2$, $Ru_3(CO)_{12}$; $Sm(N(Si(CH_3)_3)_2)_3$, $C_{27}H_{39}Sm$; $SC(N(Si(CH_3)_3)_2)_3$, $SC(C_5H_5)_3$; $Se(C_2H_5)_2$, $(CH_3)_2Se$; $H_2N(CH_2)_3Si(OC_2H_5)_3$, $C_7H_{19}NSi$, $(CH_3)_3SiSi(CH_3)_2O$, $[CISi(CH_3)_2]_2$, $C_8H_{23}NSi_2$, $(SiCH_3(C_6H_5)_2)_2$, $(Si(CH_3)_2)_6$, $(Si(CH_3)_3)_2$, $(CH_3)_3SiNHSi(CH_3)_3$, $(CH_3)_3SiNHSi(CH_3)_3$, $CH_3SiH_3$, $(CH_3SiHO)_5$, $(CH_3)_3SiSi(CH_3)_2H$, $SiBr_4$, $SiBr_4$, $SiCl_4$, $SiCl_4$, $SiCl_4$, $SiI_4$, $Cl_4SiSi(CH_3)_2$, $Si(C_2H_5)_4$, $(HSiCH_3O)_4$, $(CH_3)_2SiHSiH(CH_3)_2$, $Si(CH_3)_4$, $HSi(HNC(CH_3)_3)_3$, $((CH_3)_3CO)_3SiOH$, $[(H_3C)_2CHO]_3SiOH$, $(CH_3CH_2C(CH_3)_2O)_3SiOH$; $C_{28}H_{48}O_2Sr$, $C_{22}H_{38}O_4Sr$; $Ta(N(CH_3)_2)_5$, $Ta(OC_2H_5)_5$, $(CH_3)_3CNTa(N(C_2H_5)_2)_3$, $(CH_3)_3CNTa(N(C_2H_5)_2)_3$, $C_2H_5NTa(N(C_2H_5)_2)_3$, $C_{13}H_{33}N_4Ta$; $TeBr_4$, $TeCl_4$; $Tb(OCC(CH_3)_3CHCOC(CH_3)_3)_3$, $Tb(N(Si(CH_3)_3)_2)_3$, $(C_5H_5)_3Tb$, $C_{27}H_{39}Tb$; $Tm(N(Si(CH_3)_3)_2)_3$, $(C_5H_5)_3Tm$; $[[(CH_3)_3Si]_2N]_2Sn$, $[CH_3(CH_3)_3]_2Sn(C_6H_5)_2$, $[(C_6H_5)_3Sn]_2$, $(H_2C=CHCH_2)_4Sn$, $[(C_2H_5)_2N]_4Sn$, $[(CH_3)_2N]_4Sn$, $Sn(CH_3)_4$, $Sn(CH=CH_2)_4$, $C_{10}H_{14}O_4Sn$, $(C_6H_{11})_3SnH$, $C_6H_5C≡CSn(CH_3)_3$, $C_6H_5Sn(CH_3)_3$; $C_{18}H_{26}C_{12}Ti$, $Ti(N(CH_3)_2)_2(N(CH_2CH_3)_2)_2$, $[(C_2H_5)_2N]_4Ti$, $[(C_2H_5)_2N]_4Ti$, $[(CH_3)_2N]_4Ti$, $[(CH_3)_2N]_4Ti$, $[(CH_3C_2H_5)N]_4Ti$, $Ti[OCC(CH_3)_3CHCOC(CH_3)_3]_2(OC_3H_7)_2$, $Ti[OCH(CH_3)_2]_4$, $TiCl_4$; $C_{18}H_{26}I_2W$, $(C_4H_9NH)_2W(C_4H_9N)_2$, $((CH_3)_3CN)_2W(N(CH_3)_2)_2$, $((CH_3)_3CN)_2W(N(CH_3)_2)_2$, $C_{10}H_{10}C_{12}W$, $C_{10}H_{12}W$, $(C_5H_4CH(CH_3)_2)_2WH_2$, $C_8H_6O_3W$, $C_{12}H_{12}O_4W$, $(NH_3)_3W(CO)_3$, $W(CO)_6$; $V(C_5H_5)_2$, $C_{14}H_{18}V$, $OV(OCH(CH_3)_2)_3$; $[[(CH_3)_3Si]_2N]_3Yb$, $Yb(C_5H_5)_3$; $[[(CH_3)_3Si]_2N]_3Y$, $[[(CH_3)_3Si]_2N]_3Y$, $Y(C_5H_4CH_2(CH_2)_2CH_3)_3$, $Y(C_5H_5)_3$, $C_9H_{21}O_6Y$, $C_9H_{21}O_3Y$, $Y(OCC(CH_3)_3CHCOC(CH_3)_3)_3$; $(C_6F_5)_2Zn$, $Zn(OCC(CH_3)_3CHCOC(CH_3)_3)_2$, $(C_2H_5)_2Zn$, $(C_2H_5)_2Zn$, $(C_6H_5)_2Zn$, $Zn$; $C_{10}H_{12}Zr$, $Zr(CH_3C_5H_4)_2CH_3OCH_3$, $C_{22}H_{36}Zr$, $[(C_2H_5)_2N]_4Zr$, $[(CH_3)_2N]_4Zr$, $[(CH_3)_2N]_4Zr$, $[(CH_3)_2N]_4Zr$, $Zr(NCH_3C_2H_5)_4$, $Zr(NCH_3C_2H_5)_4$, $C_{18}H_{32}O_6Zr$, $Zr(OCC(CH_3)_3CHCOC(CH_3)_3)_2(OC_3H_7)_2$, $Zr(C_8H_{15}O_2)_4$, $Zr(OCC(CH_3)_3CHCOC(CH_3)_3)_4$, or a combination thereof.

Other examples of the metal oxide precursor include metal-containing compounds capable of being chemically bonded to nitrogen N atoms of the networked structure of branched polynucleotides, thereby being chemically adsorbed onto the networked structure of branched polynucleotides. In the case of chemical adsorption in comparison with the case of physical adsorption, a metal oxide precursor layer, which is more homogenous and firm, may be formed on a surface of the networked structure of branched polynucleotides. Examples of such a metal oxide precursor include $Ti\{OCH(CH_3)_2\}_4$, $C_{18}H_{26}Cl_2Ti$, $Ti(N(CH_3)_2)_2(N(CH_2CH_3)_2)_2$, $[(C_2H_5)_2N]_4Ti$, $[(CH_3)_2N]_4Ti$, $TiCl_4$, $(CH_3)_3Al$, $Al(N(CH_3)_2)_3$, $[(CH_3)_2CHCH_2]_3Al$, $Al(OCC(CH_3)_3CHCOC(CH_3)_3)_3$, $(C_2H_5)_2Zn_3$, $(C_6F_5)_2Zn$, $Zn(OCC(CH_3)_3CHCOC(CH_3)_3)_2$, $(C_6H_5)_2Zn$, $Cu(OCC(CH_3)_3CHCOCF_2CF_2CF_3$, $Cu(OCC(CH_3)_3CHCOC(CH_3)_3)_2$, $Mn(C_5H_5)_2$, $Mn(C_5(CH_3)_5)_2$, $C_5H_4CH_3Pt(CH_3)_3$, $[[(CH_3)_3Si]_2N]_2Sn$, $[(C_6H_5)_3Sn]_2$, $[CH_3(CH_3)_3]_2Sn(C_6H_5)_2$, $C_8H_{10}Ni$, $Ni(C_5H_5)_2$, $Ni(C_5H_4C_2H_5)_2$, $V(C_5H_5)_2$, $C_{14}H_{18}V$, $OV(OCH(CH_3)_2)_3$, or a combination thereof.

The adsorbing of the metal oxide precursor onto the template may be physically or chemically carried out. In the case of chemical adsorption in comparison with the case of physical adsorption, a metal oxide precursor layer, which is more homogenous and firm, may be formed on a surface of the networked structure of branched polynucleotides.

The adsorbing of the metal oxide precursor onto the template (step 100) may be carried out by, for example, a process including disposing the template inside a reaction chamber, and injecting a metal oxide precursor gas into the reaction chamber.

The reaction chamber may have a temperature, for example, in a range of about 60° C. to about 150° C. for the adsorption of the metal oxide precursor. When the temperature of the reaction chamber is too low, a reaction for forming the metal oxide may not efficiently proceed. On the other hand, when the temperature of the reaction chamber is too high, serious deformation or degradation of the networked structure of branched polynucleotides may occur, and accordingly a collapsed structure may result. In this case, a structure may not be obtained in a desired shape.

The adsorption time for the metal oxide precursor gas, i.e., the time required for contacting the template with the metal oxide precursor gas, may be, for example, in a range of about 1 second to about 100 seconds. When the adsorption time of the metal oxide precursor gas is too short, an adsorption layer may not be sufficiently homogenously formed over the entire surface of the networked structure of branched polynucleotides. In particular, in the case of chemical adsorption, the bonding between the metal oxide precursor and N atoms of the networked structure of branched polynucleotides may proceed insufficiently. On the other hand, when the adsorption time of the metal oxide precursor gas is too long, dissipation of the precursor gas may occur. In addition, when the adsorption time of the metal oxide precursor gas is too long, excessive adsorption may occur, and as a result, a metal oxide structure that is finally obtained may have a larger pore size than the desired pore size. In this case, there may be difficulties in controlling the pore size.

Termination of the adsorption of the metal oxide precursor gas may be performed by, for example, injecting purge gas into the reaction chamber. In addition, when the purge gas is injected into the reaction chamber, the injected purge gas may remove surplus metal oxide precursors that are present other than in a chemically-formed adsorption layer or a physically-formed adsorption layer. The purge gas may be, for example, nitrogen gas $N_2$. The time required for injecting the purge gas into the reaction chamber may be, for example, in a range of about 10 seconds to about 300 seconds. When the injection time is too short, the removal of the surplus metal oxide precursors may be insufficient. On the other hand, when the injection time is too long, time required for the total process may be increased without further improving the removal of the surplus metal oxide precursors.

The decomposing and converting of the adsorbed metal oxide precursor into the metal oxide (step 200) may be carried out by, for example, a process including contacting the adsorbed metal oxide precursor with a decomposing agent of the metal oxide precursor. The decomposing agent of the metal oxide precursor may be, for example, water vapor.

The decomposing of the adsorbed metal oxide precursor (step 200) may be performed at a temperature, which may be, for example, the same as the temperature of the reaction chamber used for the adsorption of the metal oxide precursor. The temperature at which the adsorbed metal oxide precursor is decomposed may be, for example, in a range of about 60° C. to about 150° C.

By decomposing and converting of the adsorbed metal oxide precursor into the metal oxide, a surface of the networked structure of branched polynucleotides may be coated with a firm metal oxide layer. Such a metal oxide layer may have a structure inherited from the networked structure of branched polynucleotides that are used as the template.

The removing of the template (step 300) may be carried out by, for example, a process including thermally decomposing the networked structure of branched polynucleotides. By heating the networked structure of branched polynucleotides, which is coated with the metal oxide layer, at a temperature higher than the temperature of the thermal decomposition of the networked structure of branched polynucleotides, the networked structure of branched polynucleotides may be removed. Accordingly, the heat-resistant metal oxide layer maintains a networked structure inherited from the networked structure of branched polynucleotides that is used as the template. The temperature of the thermal decomposition may be, for example, in a range of about 400° C. to about 600° C.

In some example embodiments, the removing of the template (step 300) may be carried out by, for example, a process including dissolving the networked structure of branched polynucleotides with a solvent capable of dissolving polynucleotides. The solvent capable of dissolving the polynucleotides may be, for example, water, alcohol, or a combination thereof. The metal oxide layer that is not dissolved by the solvent maintains a networked structure inherited from the networked structure of branched polynucleotides that are used as the template. The space that has been occupied by the networked structure of branched polynucleotides may provide additional pores after the removal of the networked structure of branched polynucleotides.

In some other example embodiments, the steps of adsorbing the metal oxide precursor onto the template that include the networked structure of branched polynucleotides, and decomposing and converting the adsorbed metal oxide precursor into the metal oxide, may be repeated at least twice. Adjustment of the number of repetitions may lead to a control of the thickness of the metal oxide layer to be coated on the surface of the networked structure of branched polynucleotides, and a control of the pore size of the porous metal oxide structure that is finally obtained. In addition, a metal oxide layer that is formed by a given step of adsorbing the metal oxide precursor onto the template may be different from the metal oxide layer obtained via another step of adsorbing the metal oxide precursor onto the template. Accordingly, a multifunctional multilayer-metal oxide structure may be formed.

The example steps of adsorbing the metal oxide precursor onto the template having the networked structure of branched polynucleotides, and decomposing and converting the adsorbed metal oxide precursor into the metal oxide may be performed by, for example, a process of atomic layer deposition.

According to another example embodiment, provided is a porous metal oxide structure prepared according to the example method discussed above. The porous metal oxide structure may be, for example, a $TiO_2$ structure, a $Ga_2O_3$ structure, a $HfO_2$ structure, an $In_2O_3$ structure, a ZnO structure, a SnO structure, an $Al_2O_3$ structure, or a combination thereof.

EXAMPLE

Preparation Example 1

Preparation of Networked Structure of Branched Polynucleotides

First, as an example branched polynucleotide, an X-DNA monomer (see Nature Protocols 2009, 4, 1759-1770) was prepared by the following procedures. Polynucleotides X11 (SEQ ID NO: CGACCGATGAATAGCGGTCAGATCCG-TACCTACTCGGGCC), X12 (SEQ ID NO: CGAGTAGG-TACGGATCTGCGTATTGCGAACGACTCGGGCC), X13 (SEQ ID NO: CGAGTCGTTCGCAATACGGCTGTACG-TATGGTCTCGGGCC), and X14 (SEQ ID NO: CGAGAC-CATACGTACAGCACCGCTATTCATCGGTCGGGCC), which were tailor-made by IDT company (Integrated DNA Technologies Inc., Iowa, USA), were obtained. Then, X11, X12, X13, X14, and NaCl were added to a 1 xTE buffer solution (at pH 8.0) to obtain a conjugation mixture. X11, X12, X13, X14, and NaCl each had a concentration of 0.1 mM, 0.1 mM, 0.1 mM, 0.1 mM, and 100 mM, in the conjugation mixture. The obtained conjugation mixture was then left intact at a temperature of 95° C. for 2 minutes. The temperature of the conjugation mixture was lowered to 65° C., and then, conjugation mixture was left intact at a temperature of 65° C. for 2 minutes. The temperature of the conjugation mixture was lowered again to 60° C., and then, the conjugation mixture was left intact at a temperature of 60° C. for 5.5 minutes. Steps of lowering the temperature of the conjugation mixture by 1° C. and leaving the conjugation mixture intact for 30 seconds were repeated until the temperature of the conjugation mixture reached 20° C. Next, the temperature of the conjugation mixture was lowered to 4° C., thereby completing the conjugation and obtaining a X-DNA monomer solution. The obtained X-DNA monomer solution was stored at a temperature of 4° C. or −20° C. until it is used in the preparation of DNA hydrogels.

Next, 2 μl (i.e., 6 units) of the T4 DNA ligase (USA, Promega, T4 DNA ligase, 3 unit/μl) was added to 500 μg (5.04 nmol) of the X-DNA monomer solution having a temperature of 25° C., so as to obtain a reaction mixture. Then, a ligase buffer solution (USA, Promega, ligase buffer, 10×) was added to the obtained reaction mixture in an amount of 10 parts by volume based on 100 parts by volume of the reaction mixture. Here, the resultant mixture had a pH of 7. The resultant mixture was stirred for 24 hours so as to obtain branched DNA hydrogels. The branched DNA hydrogels were freeze-dried to obtain a networked structure of branched polynucleotides of Preparation Example 1.

Example 1

Preparation of Porous $TiO_2$ Structure

Figure 2:
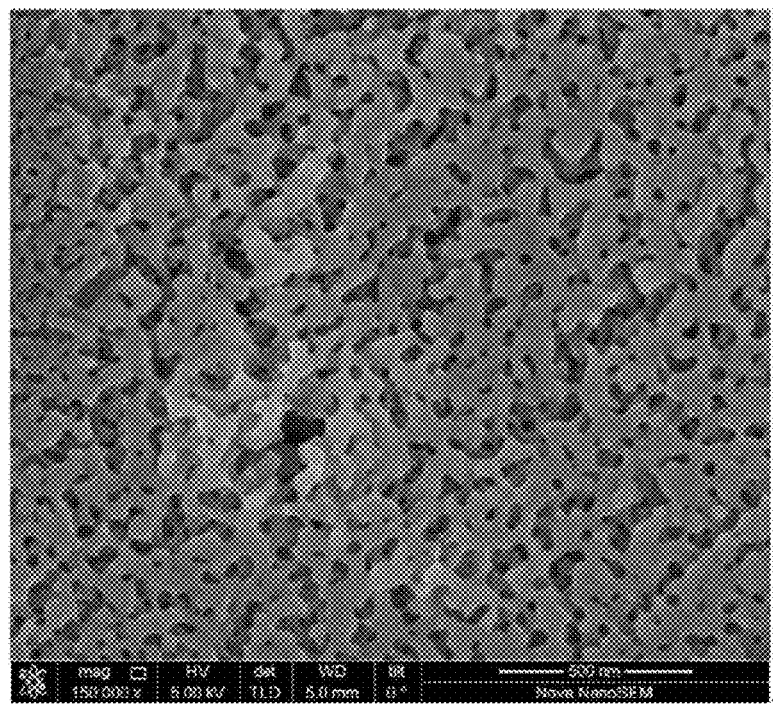
FIG. 2 is an electron microscope image of a porous $TiO_2$ structure, according to at least one example embodiment.

The networked structure of branched polynucleotides of Preparation Example 1 was introduced into a reaction chamber of an atomic layer deposition device (NCD, Lucida™ D100). Then, the reaction chamber was supplied with titanium isopropoxide ($Ti\{OCH(CH_3)_2\}_4$). Here, the reaction chamber was prepared under conditions such as a temperature of 110° C. and a pressure of 0.1 torr. Then, the networked structure of branched polynucleotides of Preparation Example 1 was brought into contact with titanium isopropoxide ($Ti\{OCH(CH_3)_2\}_4$) for 20 seconds. Then, the reaction chamber was purged with 20 sccm (standard cubic centimeter per minute) of $N_2$ gas for 60 seconds, and then provided with 20 sccm of water vapor for 20 seconds. Here, the temperature of the reaction chamber was 110° C. and the pressure of the reaction chamber was 0.1 torr. Next, the reaction chamber was purged again with 20 sccm of $N_2$ gas for 60 seconds. The cycle consisting of titanium isopropoxide/$N_2$/water vapor/$N_2$ as in the stated order was repeated 200 times. Here, the deposition rate was 0.1 Å per cycle. Then, the networked structure of branched polynucleotides was removed from the reaction chamber, and then, heated at a temperature of 550° C. for 12 hours in an air atmosphere. As a result, a porous $TiO_2$ structure of Example 1 was obtained. FIG. 2 is an electron microscope image of the porous $TiO_2$ structure of Example 1.

Example 2

Preparation of $Al_2O_3$ Structure

Figure 3:
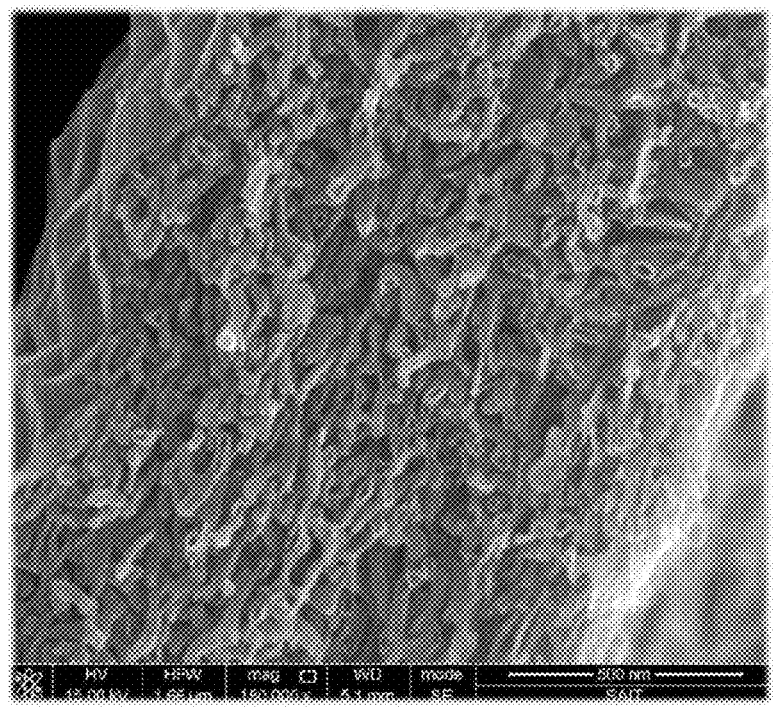
FIG. 3 is an electron microscope image of a porous $Al_2O_3$ structure, according to at least one example embodiment.

The example networked structure of branched polynucleotides of Preparation Example 1 was added to a reaction chamber of an atomic layer deposition device (NCD, Lucida™ D100). The reaction chamber was then provided with $(CH_3)_3Al$. The reaction chamber was prepared under conditions such as a temperature of 110° C. and a pressure of 0.1 torr. The networked structure of branched polynucleotides of Preparation Example 1 was then brought into contact with $(CH_3)_3Al$ for 20 seconds. The reaction chamber was then purged with 20 sccm of $N_2$ gas for 60 seconds, followed by being provided with 20 sccm of water vapor for 20 seconds. The temperature of the reaction chamber was 110° C. and the pressure of the reaction chamber was 0.1 torr. Next, the reaction chamber was purged again with 20 sccm of $N_2$ gas for 60 seconds. The cycle consisting of $(CH_3)_3Al/N_2/$ water vapor/$N_2$ as in the stated order was repeated 50 times. The deposition rate was 1 Å per cycle. The networked structure of branched polynucleotides was then removed from the reaction chamber, and heated at a temperature of 550° C. for 12 hours in an air atmosphere. As a result, a porous $Al_2O_3$ structure of Example 2 was obtained. FIG. 3 is an electron microscope image of the porous $Al_2O_3$ structure of Example 2.

Example 3

Manufacture of ZnO Structure

Figure 4:
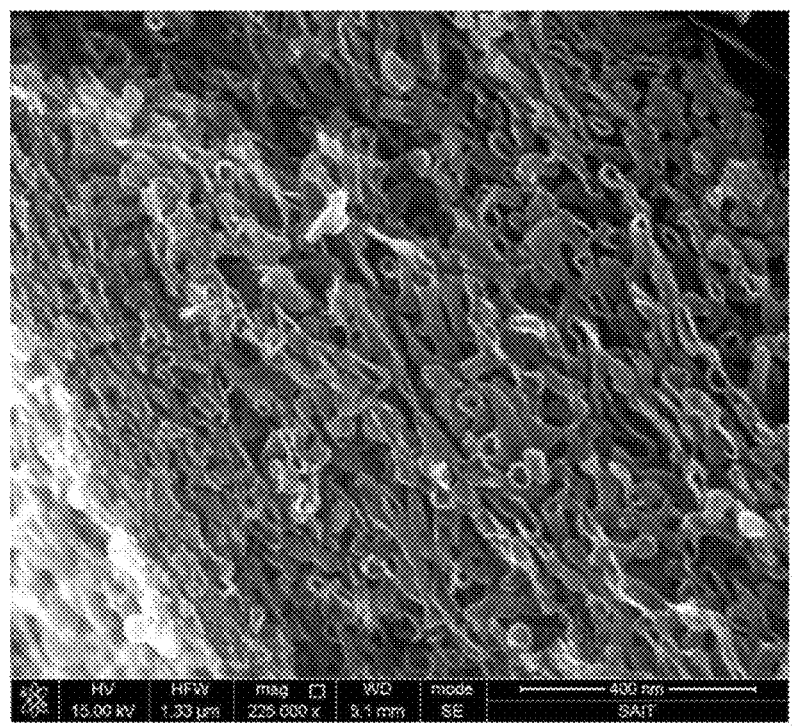
FIG. 4 is an electron microscope image of a porous ZnO structure, according to at least one example embodiment.

The example networked structure of branched polynucleotides of Preparation Example 1 was added to a reaction chamber of an atomic layer deposition device (NCD, Lucida™ D100). The reaction chamber was then provided with $(C_2H_5)_2Zn$. The reaction chamber was prepared under conditions such as a temperature of 110 t and a pressure of 0.1 torr. The networked structure of branched polynucleotides of Preparation Example 1 was then brought into contact with $(C_2H_5)_2Zn$ for 20 seconds. The reaction chamber was then purged with 20 sccm of $N_2$ gas for 60 seconds and then provided with 20 sccm of water vapor for 20 seconds. The temperature of the reaction chamber was 110° C. and the pressure of the reaction chamber was 0.1 torr. Next, the reaction chamber was purged again with 20 sccm of $N_2$ gas for 60 seconds. The cycle consisting of $(C_2H_5)_2Zn/N_2$/water vapor/ $N_2$ as in the stated order was repeated 40 times. Here, the deposition rate was 1.5 Å per cycle. The networked structure of branched polynucleotides was then removed from the reaction chamber and heated at a temperature of 550 t for 12 hours in an air atmosphere. As a result, a porous a ZnO structure of Example 3 was obtained. FIG. 4 is an electron microscope image of the porous ZnO structure of Example 3.

As described above, according to the one or more of the above example embodiments, a networked structure of branched polynucleotides may be used as a template so as to facilitate a control in a pore structure of a porous metal oxide structure.

It should be understood that the example embodiments described therein should be considered in a descriptive sense only and not for purposes of limitation. Descriptions of features within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the example embodiments as defined by the following claims.

What is claimed is:

1. A method of preparing a porous metal oxide structure, the method comprising:
    adsorbing a metal oxide precursor onto a template that includes a networked structure of branched polynucleotides;
    decomposing and converting the adsorbed metal oxide precursor into a metal oxide; and
    removing the template.

2. The method of claim 1, wherein the networked structure of branched polynucleotides is obtained by freeze-drying branched polynucleotide hydrogels.

3. The method of claim 1, wherein the metal oxide precursor is configured to adsorb onto the networked structure of branched polynucleotides by chemically bonding to nitrogen atoms of the networked structure of branched polynucleotides.

4. The method of claim 3, wherein the metal oxide precursor comprises $Ti\{OCH(CH_3)_2\}_4$, $C_{18}H_{26}Cl_2Ti$, $Ti(N(CH_3)_2)_2(N(CH_2CH_3)_2)_2$, $[(C_2H_5)_2N]_4Ti$, $[(CH_3)_2N]_4Ti$, $TiCl_4$, $(CH_3)_3Al$, $Al(N(CH_3)_2)_3$, $[(CH_3)_2CHCH_2]_3Al$, $Al(OCC(CH_3)_3CHCOC(CH_3)_3)_3$, $(C_2H_5)_2Zn$, $(C_6F_5)_2Zn$, $Zn(OCC(CH_3)_3CHCOC(CH_3)_3)_2$, $(C_6H_5)_2Zn$, $Cu(OCC(CH_3)_3CHCOCF_2CF_3$, $Cu(OCC(CH_3)_3CHCOC(CH_3)_3)_2$, $Mn(C_5H_5)_2$, $Mn(C_5(CH_3)_5)_2$, $C_5H_4CH_3Pt(CH_3)_3$, $[[(CH_3)_3Si]_2N]_2Sn$, $[(C_6H_5)_3Sn]_2$, $[CH_3(CH_3)_3]_2Sn(C_6H_5)_2$, $C_8H_{10}Ni$, $Ni(C_5H_5)_2$, $Ni(C_5H_4C_2H_5)_2$, $V(C_5H_5)_2$, $C_{14}H_{18}V$, $OV(OCH(CH_3)_2)_3$, or a combination thereof.

5. The method of claim 1, wherein the adsorbing of the metal oxide precursor onto the template comprises:
    disposing the template inside a reaction chamber; and
    injecting a metal oxide precursor gas into the reaction chamber.

6. The method of claim 5, wherein the inside of the reaction chamber is at a temperature in a range of about 20° C. to about 150° C.

7. The method of claim 1, wherein the decomposing and converting of the adsorbed metal oxide precursor into the metal oxide comprises:
    contacting the adsorbed metal oxide precursor with a metal oxide precursor decomposer.

8. The method of claim 1, wherein the removing of the template comprises:
    thermally decomposing the networked structure of branched polynucleotides.

9. The method of claim 1, wherein the removing of the template comprises:
    dissolving the networked structure of branched polynucleotides with a solvent.

10. The method of claim 1, wherein the steps of adsorbing the metal oxide precursor onto the template and decomposing and converting the adsorbed metal oxide precursor are repeated two times or more.

11. The method of claim 1, wherein the steps of adsorbing the metal oxide precursor onto the template and decomposing and converting the adsorbed metal oxide precursor are performed by atomic layer deposition.

12. A porous metal oxide structure prepared by the method of claim 1.

* * * * *